No. 743,614. PATENTED NOV. 10, 1903.
A. A. BROOKS.
MAGAZINE PLATE CHANGING APPARATUS FOR PHOTOGRAPHIC CAMERAS.
APPLICATION FILED JAN. 9, 1903.
NO MODEL. 2 SHEETS—SHEET 1.
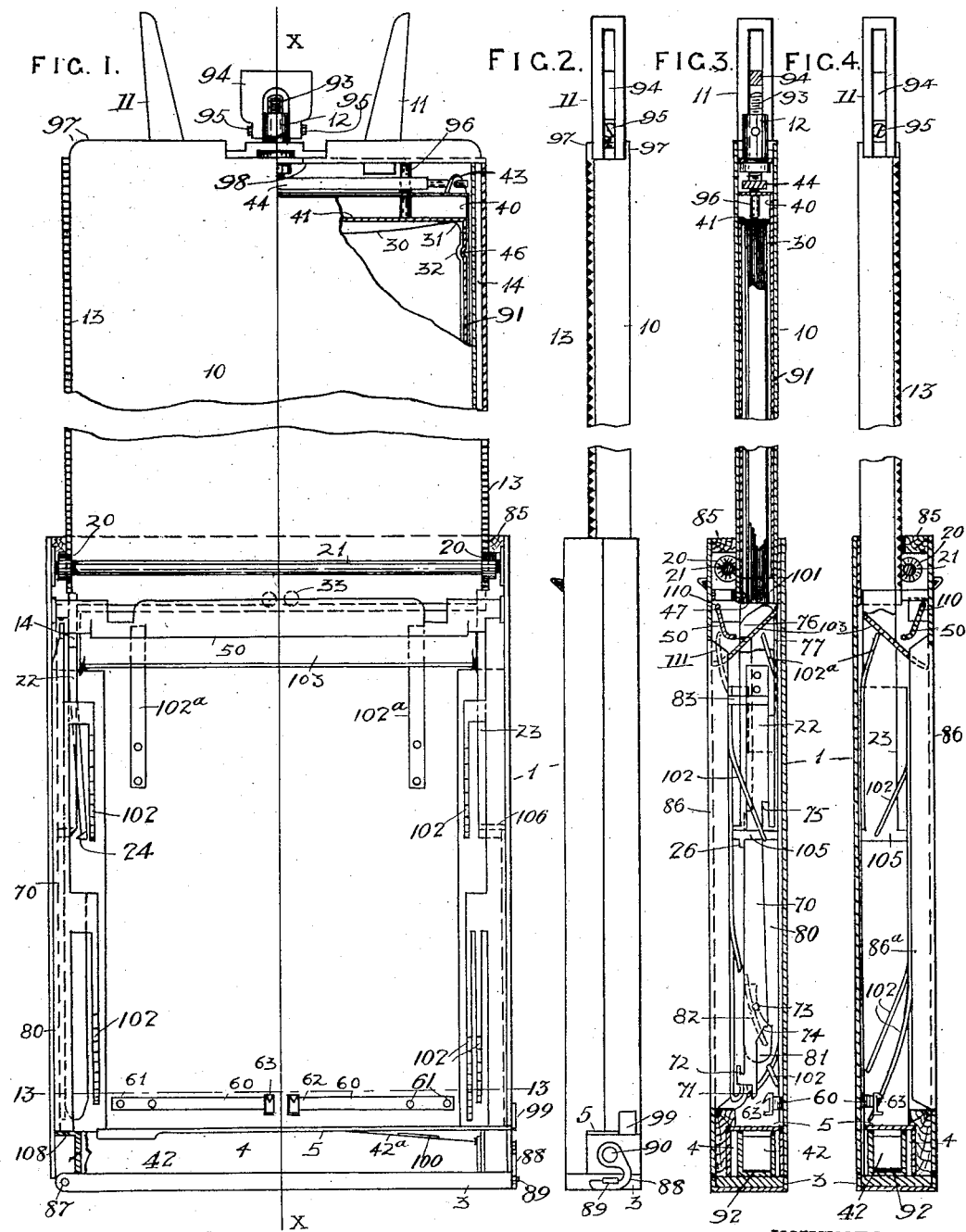
WITNESSES
INVENTOR
A. A. Brooks
By his attorney
Edward P. Thompson

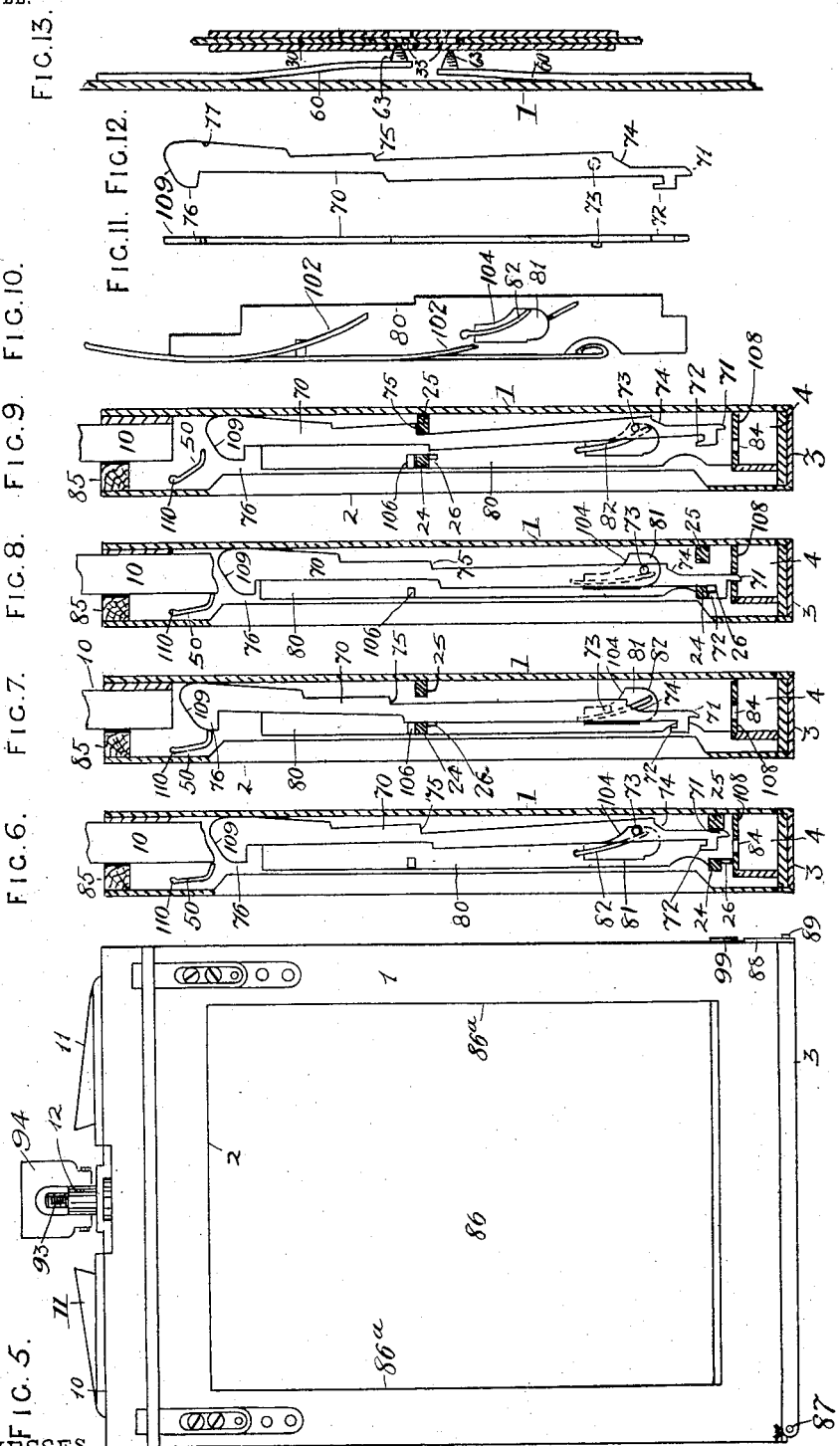

No. 743,614. Patented November 10, 1903.

UNITED STATES PATENT OFFICE.

ARTHUR AUGUSTUS BROOKS, OF LIVERPOOL, ENGLAND.

MAGAZINE-PLATE-CHANGING APPARATUS FOR PHOTOGRAPHIC CAMERAS.

SPECIFICATION forming part of Letters Patent No. 743,614, dated November 10, 1903.

Application filed January 9, 1903. Serial No. 138,328. (No model.)

*To all whom it may concern:*

Be it known that I, ARTHUR AUGUSTUS BROOKS, a subject of the King of Great Britain and Ireland, and a resident of Liverpool, in the county of Lancaster, England, have invented new and useful Improvements in Magazine-Plate-Changing Apparatus for Photographic Cameras, of which the following is a specification.

My invention relates to improved plate-changing apparatus for photographic cameras of that type wherein a number of sensitized plates are held or contained in a magazine or box which is arranged to slide in an exposure-frame and which is provided with apparatus for successively drawing out from the magazine the plates and exposing them in the frame to take a picture and subsequently returning them to the magazine.

The object of my invention is to provide simple and effective means for successively drawing out the plates one by one, this means operating automatically by the drawing out of the holder, thereafter pressing them against the opening of the exposure-frame, at which time the picture is taken, this operation being automatically performed by pushing in the slide which carries the magazine and thereafter for causing the exposed plate to be returned to the magazine automatically by again drawing out and pushing in the slide.

My apparatus consists, generally speaking, of a box-like exposure-frame having an exposure-aperture at its front side, against which the plate is pressed during the operation of taking the picture, and a box-shaped slide or magazine-carrier, which is arranged to telescope into the exposure-frame and is provided with means for receiving a specially-formed plate-case, which is adapted to slide thereinto through the lower open end thereof and to carry a number of sensitized plates.

The principle of my improvements is based upon the following cycle of operations: The magazine-holder or slide is first drawn out, and in this operation a sensitized plate is automatically withdrawn from the back thereof; secondly, the slide is pushed in, which operation causes the withdrawn plate to be pressed against the exposure-frame, when the picture is taken; thirdly, the slide is again withdrawn, which places the exposed plate in a position to be pushed back into the magazine or plate-case; fourthly, the slide is pushed home again, which causes the exposed plate to be pushed back into the magazine, but this time at the front side thereof. This cycle of operations, it will be seen, causes the plates to be successively withdrawn from the back or from the lower side of the pile of plates and replaced at the front or on top of the pile of plates, and this continues until all have been exposed.

My improvements embody in particular means for preventing a plate from being withdrawn during the second withdrawal of the slide—that is to say, for causing a plate to be withdrawn only at every alternate withdrawal of the slide—and also for preventing the withdrawn plate from being pushed back into the magazine at the first pushing in of the slide—that is to say, to cause the plate withdrawn to be returned to the slide only at every alternate pushing in of the slide—and these means are practically essential to the successful utilization of the apparatus.

In the accompanying drawings I have illustrated a plate-changing apparatus in accordance with my invention, and wherein—

Figure 1 is a front elevation, partly in section, of the apparatus, the front wall of the exposure-frame and a part of the slide and magazine or plate-case being removed to show the interior construction, the slide being shown in its withdrawn position and the plate-case *in situ.* Fig. 2 is a side elevation from the right-hand side of the complete apparatus, the parts being in the same positions as shown in Fig. 1. Fig. 3 is a longitudinal median section of the same under line X X of Fig. 1 looking toward the left. Fig. 4 is a similar section looking toward the right, except that the slide in this figure is shown in elevation. Fig. 5 is a complete front elevation of the apparatus when the slide is pushed completely in. Fig. 6 is a longitudinal section close to the side wall of the exposure-frame, the slide being in its pushed-in position and being shown partly broken away. Fig. 7 is a similar sectional view showing the parts in position after the first withdrawal of the slide. Fig. 8 is a similar sectional view showing the positions of the parts after the first pushing in of the slide. Fig. 9 is a similar sectional view after the second withdrawal of the slide. Fig. 10 is a detail view showing the cam-plate, which lies at the left-hand side wall of the exposure-frame. Figs. 11 and 12 are respectively a front and side elevation of the detent-bar operating in connection with the plate shown in Fig. 10; and Fig. 13 is a transverse section, on a magnified scale, taken on the line 13 13 of Fig. 1, to show the operation of the withdrawal-fingers.

The apparatus consists of two main members—that is to say, the flat box-shaped exposure-frame (designated 1) and the slide or magazine-case 10, which latter is arranged to telescope into the box 1 from the upper open end thereof, this end being provided with joint material 85, surrounding the sides of the slide 10 so as to make a close yet easy-running joint. The exposure-frame 1 has a solid back and sides and in its front side has a rectangular or otherwise shaped exposure-aperture 86, having flanged sides 86$^a$, against the rear face of which the sensitive plate is pressed during the operation of taking the picture. The lower end of the exposure-frame is left open and is closed by a light-proof door 3, which is hinged at 87 at one end and locked in closed position by a pivoted hook 88, which engages with a projecting lug 89 on the free end of the door 3, the hook 88 being pivotally mounted on the pin 90, projecting from the side of the exposure-frame. At the upper end of the exposure-frame there is rotatably mounted, just within the front wall thereof, a transverse shaft 21, which carries at each end a gear-pinion 20, these gear-pinions respectively meshing in one of the pair of racks 13, formed on the opposite lateral edges of the slide 10. These racks and pinions are merely for the purpose of steadying the slide 10 in its withdrawn position and holding it in proper relation to the exposure-frame, thus preventing it from binding when being pushed in or drawn out.

Referring to the construction of the slide or magazine-holder 10 in detail, it consists of a plain rectangular box closed on all sides except the bottom, where it is open and through which the plate case or magazine is inserted. This case (designated as a whole 91) is also substantially a plain rectangular case of sheet metal open at one end only, through which the sensitive plates 30 are introduced and which when properly packed is covered by a thin metal cap 42 of plain rectangular form, but necessarily slightly larger than the magazine, so as to telescope over it in the usual manner of box-covers. The opposite end of the magazine is closed by the end plate 41; but it also has an angular extension 40, which has a flange parallel to the plate 41, as shown in Figs. 1 and 3, and through which pass the means for securing the magazine in place in the slide 10, as will be seen, without piercing the plate 41, the cap 42 being provided at its bottom with a covering of felt or similar light-proof material 92, so that when the cap is in place the magazine is light-proof.

The appendages by means of which the magazine is secured in place in the slide are more explicitly as follows: The angular extension 40 has at its upper end a pair of ears 43, as shown in Fig. 1, in which ears is journaled a transverse bar 44, which has secured at right angles thereto at its center a screw-stem 93. At the closed end of the slide 10 is rotatably mounted a nut 12, which is provided with a thumb-plate 94 for turning it, pivoted thereto by screws 95. When the magazine is pushed into the slide, the screw-stem 93 engages with the nut 12 and may then be drawn into place by rotating the latter by means of the plate 94, this plate being rotatably mounted merely in order to enable it to lie flat and take up less space in shipment or carriage of the apparatus. Further, from the inner side of the end wall 98 of the slide 10 project a pair of posts 96, which pass through holes in the bar 44 and extension 40, respectively, thus holding the magazine in proper position and forming stops to limit its movement when drawn in by the nut 12.

In addition to the thumb-plate 94 the slide 10 is also preferably provided with a pair of pivotally-mounted finger-grips 11, these being attached to flanges 97, which are formed as extensions of the front and back sides of the slide 10 beyond the end wall 98 and which when the apparatus is to be stored away fold down within the flanges 97, as shown in Fig. 5. These finger-grips are for enabling the slide to be readily drawn out and pushed in with relation to the exposure-frame.

The mechanism for manipulating the successive plates and causing them to be drawn out, exposed, and returned to the plate case or magazine is located around the inner walls of the body of the exposure-frame, principally at the side thereof, and will be referred to later on. At the bottom of the exposure-frame is formed a chamber 4 of just the proper size to receive and hold the cap 42 of the magazine, and it is separated from the body of the exposure-frame by a sliding plate 5, which has an angular flange 99 formed at one end (the right-hand end, Fig. 1) to enable it to be readily drawn out and pushed in through a slot in the right-hand side wall of the exposure-frame. The cap 42 has, moreover, as shown in Fig. 1, a beveled edge 42$^a$ at one end, which is engaged by a pair of snugs 100, projecting from the inner wall of the chamber 4, so as to cause the cap 42 to be detained in the chamber 4 while the magazine itself is being drawn into the slide in the manner already described.

The manner of using the apparatus as thus far described is as follows: The magazine which is intended to be sealed, containing a certain number of plates, first has its seal, consisting, for instance, of a paper strap covering the joint between the cap 42 and the magazine, broken, as by passing a knife along the joint. The slide 10 being pushed in and the door 3 being now opened by unfastening the hook 88, the magazine is introduced into the open end of the slide with the end 41 foremost. When it has been pushed completely in, the door 3 is closed and hooked, as shown in the drawings, the cap 42 being then in the chamber 4 and still covering the end of the magazine. The magazine is next drawn into the slide by rotating the nut 12 in the manner aforesaid until brought to a stop by the posts 96. During this operation the magazine is drawn out of the cap 42, which latter is detained by the snugs 100 in the chamber 4, and the sliding plate 5 is next pushed in, when the apparatus is ready for use.

I will now describe the means by which the plates are withdrawn from the magazine, exposed before the aperture 86, and returned to the magazine again by drawing out and pushing in the slide. At the back of the exposure-frame are mounted a pair of spring-fingers 60, whose outer ends are riveted, soldered, or otherwise attached to the back wall of the exposure-frame, as shown, and whose free ends approach each other on opposite sides of the center line of the magazine and are provided with small hooks 63, which are beveled on their upper sides, (see Figs. 3 and 4,) so as not to interfere with the pushing in of the slide. The back wall of the slide 10 and of the magazine have at their lower ends centrally-located gouges or recesses 101 (see Fig. 3) to enable these spring-fingers 60 to engage with the rearmost plate 30 in the magazine. These plates 30 have rounded notches 32, one at each side of the plate near its upper end, which notches engage with rounded transverse ribs 46, formed by a slight depression in each side wall of the magazine. The plates having flexible edge margins are adapted to give way when pushed in and permit the projections 46 to engage in and to disengage with the notches 32 resiliently, so that each plate is held in position until forcibly withdrawn. Each plate 32 has at its lower edge near the center, but slightly at one side thereof, a hole 33. The holes 33 of the alternate plates are at opposite sides of the center line, as shown in Fig. 13, and in position to be engaged successively by the hooks 63 of the spring-fingers 60. It will thus be seen that only one plate at a time can be engaged and withdrawn by the hooks 63, this plate being the bottom plate of the magazine, and the hooks 63 coming alternately into operation as the plates are withdrawn one by one. As each plate is successively engaged by one of the hooks 63, this plate is forcibly withdrawn from the slide when it is first pulled out. A set of springs 102 is provided at each side of the exposure-aperture and projecting from the inner front wall of the frame for pressing the sensitive plate bodily toward the rear and holding it flat against the front face of the slide during the taking of the picture. (One of these springs is shown partially broken away in Fig. 3 to avoid obscuring the parts behind it.) There is also provided at the upper end of the exposure-frame a spring-plate 103, acted on by wire springs 102$^a$, which project toward the aperture 86 and assist in pressing the upper end of the plate against the aperture, so that when the slide is pushed in for the first time the plate will be confined between the front wall of the slide and the flanged sides 86$^a$ of the exposure-aperture 86. This plate 103 is arranged to be depressed by the slide when pushed in, so as to lie flat against the back wall of the exposure-frame. The slide has at each side a pair of guide-bars 22 23, which are slidably mounted in recesses 14 in the sides of the slide, so as to fold up when the slide is pushed in. These plates 22 23 are adapted to assist in guiding the movements of the slide, and their lower ends are T-shaped, as shown at 105, Fig. 4, and have laterally-projecting lugs 24 25 formed thereon, which engage with snugs 106, formed in the side walls of the exposure-frame to limit the outward movement of the slide and prevent it from being drawn completely out of the frame. The lugs 24 25 also perform the function of operating a detent-bar 70, of the form shown in detail in Figs. 11 and 12, and which operates in connection with a detent-plate 80. (Shown in Fig. 10.) The lugs 24 and 25 are shown in section in Figs. 6, 7, 8, and 9, the section being taken through these lugs and behind the bar 22, which therefore does not show in these figures. The plate 80 is secured permanently to the inner wall of the exposure-frame on the left-hand side, as shown in dotted lines in Fig. 1, and its position in side elevation is as exhibited in Fig. 3. It has at a point near its lower end a slot 81, having a straight front edge and a cam-shaped curved rear edge 104, with which coöperates a small pin 73, projecting laterally from the bar 70 near its lower end, this pin 70 being formed to move back and forth in the slot 81 and being only pressed against the cam edge 104 by a wire spring 82, secured to the plate 80 at the upper end of the slot, as shown. The detent-bar 70 has, further, on its rear side near its center a downwardly-projecting shoulder 75, which is adapted to engage with the lug 25 to push it up. Near the lower end of the bar 70 is also formed an oblique shoulder 74. The bar 70 has also near its lower end on the front side a hooked projection 72, which engages positively with a tongue 26, projecting from the lower side of the lug 24 when the slide is pushed in, in the manner which will be hereinafter seen. The bar 70 has also a projecting point 71 on its lower end, which is adapted to fit into a hole 84, formed in a small transverse plate 108, forming a continuation of the sliding plate 5, this being merely to hold the bar 70 in its forwardly-rocked position, as shown in Fig. 8, during certain operations to be hereinafter referred to. Furthermore, the bar 70 has at its upper end a forwardly-projecting hump 76, which has a beveled upper edge 109, this hump being arranged to engage with and push out a transverse plate 50, which is hinged about its upper edge 110 to the inner walls of the exposure-frame and is pressed by suitable springs 111, Fig. 3, (one at each end of the plate 50,) toward the rear, the function of this plate being to press the inner edge of the exposed photographic plate inwardly, so as to come opposite the opening in the magazine when it is not to be retracted thereinto. When to be so retracted, the spring-plate 50 is engaged by the hump 76 in the manner shown in Fig. 7, so as to be pressed forward. The mode of operation of this device is as follows: The magazine containing the plates having been drawn into position in the slide, as already described, on the first withdrawal of the slide one of the hooks 63 engages the bottommost or rearmost plate of the magazine and causes it to be withdrawn and left in the exposure-frame. During the drawing out of the slide the lug 25 strikes on the shoulder 74 of the detent-bar and pushes it upward, causing it to assume the position shown in Fig. 7, in which the hump 76 strikes against the spring-plate 50 and pushes it forward, so as not to interfere with the upper edge of the sensitive plate. As the slide is drawn completely out the upper edge of the plate is pressed against the edges 86ª of the aperture 86 by the spring-plate 103. When now the magazine is pushed back into the frame, the slide passes to the rear of the sensitive plate and presses it between the plate and the exposure-aperture. During this operation the hooked projection 72 of the detent-bar, which has been pushed forwardly into the position shown in Fig. 7 by the engagement of the pin 73 with the cam edge 104, is engaged by the tongue 76, as in Fig. 8, and pushed down until the point 71 enters the hole 84 in the plate 108, thus holding the detent-bar in forward position against the pressure of the spring 82 and preventing the slide from being pushed completely home, owing to the projection 72 acting as a stop for the lug 24, and in this position the hooks 63 will not engage a sensitive plate on the second withdrawal of the slide. After the picture has been taken the slide is withdrawn a second time, when the detent-bar will remain engaged with the hole 84, so that the projection 25 will not strike the shoulder 74, but will strike the shoulder 75, which causes the detent-bar to be drawn up only a sufficient distance to release the detent-bar from the hole 84, when the spring 82 will press it backwardly, as shown in Fig. 9. In this position the spring-plate 50, being no longer pressed forward by the hump 76, acts upon the upper edge of the film or sensitive plate which has been exposed and presses it against the uppermost plate of the pile in the magazine, which slightly projects from the lower edge thereof, so that when the slide is pushed in a second time the plate will enter the magazine at the upper side and will be pushed home into the magazine, the springs 102 assisting in holding it flat. It will thus be seen that the plates are successively withdrawn from the back and returned to the front of the magazine after exposure until all have been successively exposed.

What I claim as my invention, and desire to secure by Letters Patent, is—

1. A magazine-plate-changing apparatus in which the magazine slides in the exposure-frame and from which a plate is drawn for exposure at every second outstroke, after the first, consisting of an exposure-frame having an exposure-aperture at one side; a light-proof door for charging the magazine, at the bottom, a hollow slide forming the magazine and open at the bottom adapted to hold the sensitized plates at their edges and to slide in and out of the exposure-frame at the top thereof, a hinged bar adapted to guide the exposed plate into the magazine again; two spring-fingers having claws adapted to engage holes near the bottom edges of the plates while in the magazine and detain the plates one at a time in the exposure-frame as the magazine is withdrawn, and mechanism for preventing a plate from being seized at the end of every second instroke.

2. A magazine-plate-changing apparatus in which the magazine slides in the exposure-frame and from which a plate is drawn for exposure at every second outstroke after the first, consisting of an exposure-frame having an exposure-aperture at one side; a light-proof door for charging the magazine at the bottom, a hollow slide forming the magazine and open at the bottom adapted to hold the sensitized plates at their edges and to slide in and out of the exposure-frame at the top thereof; a hinged bar adapted to guide the exposed plate into the magazine again; two spring-fingers having claws adapted to engage holes near the bottom edges of the plates while in the magazine and detain the plates one at a time in the exposure-frame as the magazine is withdrawn; a movable abutment adapted to be engaged by the magazine so that at the first outstroke upon a plate being left in the exposure-frame, the abutment is carried into a certain position, upon the second stroke the abutment is interposed so as to prevent the magazine being pushed full in and to stop the action of the hinged bar, upon the third stroke the abutment is carried out of position and the hinged bar released; and upon the fourth stroke it is carried into its initial position again.

3. A magazine-plate-changing apparatus in which the magazine slides in the exposure-frame and from which a plate is drawn for exposure at every second outstroke after the first, consisting of an exposure-frame having an exposure-aperture at one side; a light-proof door for charging the magazine at the bottom; a hollow slide forming the magazine and open at the bottom adapted to hold the sensitized plates at their edges and to slide in and out of the exposure-frame at the top thereof; a hinged bar adapted to guide the exposed plate into the magazine again; two spring-fingers each having claws adapted to engage holes in the bottom edges of the plates while in the magazine and detain the plates one at a time in the exposure-frame as the magazine is withdrawn; a slidable plate forming a movable abutment adapted to prevent the magazine being pushed full in at the first instroke and to hold the hinged bar out of action at the end of the first outstroke; and a forked projection upon the side of the magazine adapted to engage and move the abutment into its several positions.

4. A magazine-plate-changing apparatus in which the magazine slides in the exposure-frame and from which a plate is drawn for exposure at every second outstroke after the first, consisting of an exposure-frame having an exposure-aperture at one side; a light-proof door for charging the magazine at the bottom; a hollow slide forming the magazine and open at the bottom adapted to hold the sensitized plates at their edges and to slide in and out of the exposure-frame at the top thereof; a hinged bar adapted to guide the exposed plate into the magazine again; two spring-fingers having claws adapted to engage holes in the bottom edges of the plates while in the magazine and detain the plates one at a time in the exposure-frame as the magazine is withdrawn; a slidable plate having a peg upon one side adapted to engage in a cam-shaped slot formed in the side of the exposure-frame and retained therein by a spring, said plate forming a movable abutment adapted to prevent the magazine being pushed full in on the first instroke after the first withdrawal stroke and to prevent the hinged bar from guiding the plate into the magazine at the end of the first outstroke.

5. In magazine-plate-changing apparatus, the combination with an exposure-frame having an exposure-aperture at one side, a light-tight door at the bottom for charging the magazine, a hollow slide forming the magazine open at the bottom and adapted to slide in the exposure-frame; of a spring-claw fixed at the bottom of the exposure-frame and adapted to seize and detain therein the backmost plate in the magazine as the latter is withdrawn.

6. In magazine-plate-changing apparatus, the combination with an exposure-frame having an exposure-aperture at one side, a light-tight door at the bottom for charging the magazine and a hollow slide forming the magazine open at the bottom and adapted to slide in the exposure-frame; of a spring-claw fixed at the bottom of the exposure-frame adapted to seize and detain therein the backmost plate in the magazine; means for guiding the said plate into the magazine again; a slidable plate controlled by a guide and retained therein by a spring, adapted to prevent the magazine being pushed full in at the first instroke and to prevent the plate from being guided into the magazine at the end of the first outstroke.

7. In magazine-plate-changing apparatus, the combination with an exposure-frame having an exposure-orifice upon one side; a light-proof door at the bottom; a cavity above the door; a slidable plate above the cavity; a hollow slide forming the magazine in the top, having an open bottom and a rotatable stationary nut at the top, adapted to receive a case containing sensitized plates provided with a cap at the bottom and with a screw at the top adapted to engage in the said nut so as to be drawn up into the magazine thereby and strip off the cap which is retained in the said cavity when the slidable plate is withdrawn; and a hinged bar adapted to press upon the top margins of the plates when each is withdrawn so as to guide them into the magazine again; of two spring-claws fixed in the bottom of the exposure-frame adapted to engage the bottom margin of the back plate in the magazine and detain it in the exposure-frame as the magazine is withdrawn; a slidable plate having a projection forming an abutment and a nose to enter a hole in the bottom of the exposure-frame, at one end, adapted to prevent the magazine being pushed full in at the first instroke and a swelling at the other end adapted to hold the hinged bar out of action at the end of the first outstroke of the magazine and having a peg engaging in a cam-slot and a spring to hold it down therein and shoulders adapted to be engaged by a projection upon the magazine so as to move the slidable bar upward and support the said hinged bar at the end of the first outstroke.

8. A magazine-plate-changing apparatus comprising an exposure-frame having an aperture on one side thereof, a box-shaped slide telescoping within the same adapted to hold sensitive plates or films, means for causing the withdrawal of a plate from the slide when the latter is withdrawn from the exposure-frame, means for causing the sensitive plate to assume a position between the slide and exposure-aperture on the first pushing in of the slide, means operated by the slide to prevent it from being completely pushed in the first time, whereby said plate-withdrawing means are prevented from operating on the second withdrawal of the slide, means for pressing the upper edge of the film rearwardly whereby to cause it to reënter the magazine at the front, and means operated by the slide in its first withdrawal for preventing said last-mentioned means from acting, said preventing means being itself automatically prevented from action during the second withdrawal of the slide.

9. A magazine-plate-changing apparatus comprising a box-like exposure-frame having an aperture in the front wall thereof, a box-like slide telescoping thereinto, means on the exposure-frame for withdrawing the lowermost of a pile of plates contained in the slide, a detent-bar mounted at one side of the slide between it and the side wall of the exposure-frame, means carried by said detent-bar for preventing the complete pushing in of the slide when in its operative position, means for resiliently pressing the upper edge of the plate or film backwardly against the uppermost of the pile of plates in the magazine, means carried by said detent-bar for preventing the action of said last-mentioned means when said detent-bar is in its operative position, means acting when the slide is completely drawn out to press the upper edge of the sensitive film against the exposure-aperture to cause it to enter the space between said aperture and the slide when the slide is first pushed in, and means carried by said detent-bar operative during the second pulling out of the slide for returning said detent-bar to its inoperative position.

10. A magazine-plate-changing apparatus comprising a box-like exposure-frame having an aperture in one side thereof, a box-like slide telescoping within said frame, guiding means for retaining said slide in proper alinement with said exposure-frame when pulled out, said means comprising a pair of guide-bars attached to the lower edge of the slide one of which has a pair of laterally-projecting lugs 24, 25 thereon, a depending tongue 26 formed on the forward lug 24, a detent-bar located between the lateral wall of the exposure-frame and the slide, said detent-bar having a hooked projection on the front side of its lower end coöperating with said lug 24 and said tongue 26 and forming a stop for the former, said detent-bar having also a pair of downwardly-facing shoulders 74, 75 on its rear side adapted to be engaged by the lug 25, a pin 73 projecting laterally from the outer side of said detent-bar and engaging with a cam-shaped slot fixed in the side wall of the exposure-frame, a spring pressing rearwardly on said pin, means for engaging said detent-bar when in its lowermost position and drawn forward by the engagement of the projection 72 with the tongue 26, a spring-plate 50 acting to press the upper edge of a photographic plate or film against the uppermost of the pile of plates in the slide, and a hump 76 formed on the forward side of the upper end of said detent-bar said hump being formed to engage and press forward out of action said spring-plate 50 when the detent-bar is pushed up by the engagement of said lug 25 with said shoulder 74.

In testimony whereof I have signed my name to this specification in the presence of two subscribing witnesses.

ARTHUR AUGUSTUS BROOKS.

Witnesses:
GEORGE ANDREW WATSON,
RIDLEY JAMES URQUHART.